United States Patent
Panabaker et al.

(10) Patent No.: US 8,095,623 B2
(45) Date of Patent: Jan. 10, 2012

(54) DEVICE EMULATION TO FACILITATE DATA TRANSFER

(75) Inventors: Ruston Panabaker, Bellevue, WA (US); Firdosh K Bhesania, Kirkland, WA (US); Gabriel J Aul, Shoreline, WA (US); Paul E Henderson, Jr., Bellevue, WA (US); Stephen R Drake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1474 days.

(21) Appl. No.: 11/371,806

(22) Filed: Mar. 9, 2006

(65) Prior Publication Data
US 2007/0214276 A1 Sep. 13, 2007

(51) Int. Cl.
*G06F 15/16* (2006.01)
(52) U.S. Cl. ........... 709/219; 710/62; 710/110; 710/302
(58) Field of Classification Search ............. 709/219
See application file for complete search history.

(56) References Cited

U.S. PATENT DOCUMENTS

| 6,892,051 | B2 * | 5/2005 | Schmitt et al. ............... 455/41.2 |
| 2002/0199205 | A1 * | 12/2002 | Sonawane et al. ............ 725/115 |
| 2003/0149574 | A1 * | 8/2003 | Rudman ......................... 705/1 |
| 2005/0223145 | A1 * | 10/2005 | Lin et al. ........................ 710/62 |

* cited by examiner

*Primary Examiner* — Kevin Bates
*Assistant Examiner* — Hua Fan
(74) *Attorney, Agent, or Firm* — Workman Nydegger

(57) ABSTRACT

Described is a technology by which a circuit, such as one incorporated into a USB-like cable, couples a client computing device to a server computing device. The circuit outputs identification information to each computing device to indicate that the circuit corresponds to a type of hardware device, (e.g., a CD-ROM player) and an attribute (e.g., a migration cable). The circuit then allows the communication of data between the first computing device and the second computing device. For example, the server recognizes the migration cable attribute and can emulate the CD-ROM device recognized by the client, whereby the server may provide data including software code to the client computing device by emulating the CD-ROM device. Via the software code, the client computing device is bootstrapped to recognize that it is connected to the server instead of the hardware device. Data may then be migrated from the client to the server.

13 Claims, 6 Drawing Sheets

DEVICE EMULATION TO FACILITATE DATA TRANSFER

BACKGROUND

One of the drawbacks in upgrading to a new computer system or purchasing an additional main system involves the complexity in transferring data, settings and application programs from an existing computer system to the new computer system. One attempt to assist users in migrating such data was invented by Microsoft Corporation, and was implemented in a connection cable that coupled one computer system to the new computer system. Once coupled, the cable contained (in flash memory) the necessary drivers and other software to thereafter to some extent automatically handle the data migration tasks.

However, the design of that solution was somewhat flawed, in that data transfer was seen as too slow. Further, the cable had a low mean-time-between failure number, and in general cost too much, primarily as a result of the amount of flash memory that was incorporated into the cable to store the drivers and other software needed to accomplish the migration. Still further, once in a user's possession there was no easy or enforceable way to update this flash, such as to deal with bugs, and it was also difficult to include software in flash for the many varieties of operating systems that would be desirable to support. As a result, that design never became a ubiquitous computer-to-computer data migration solution.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a circuit that detects the coupling of a first (e.g., a client) computing device to one end of the circuit and a second (e.g., a server) computing device to another end of the circuit. The circuit outputs identification information to each computing device to indicate that the circuit corresponds to a type of hardware device and an attribute (which may, for example, comprise a sub-type). The circuit then allows the communication of data between the first computing device and the second computing device, including any data corresponding to requests directed to the type of hardware device and any data corresponding to emulated responses to the requests.

By having the identification data correspond to a hardware component that the client computing device recognizes as a data source, e.g., a CD-ROM device or other media player, and that the server computer recognizes as a data transfer device (e.g., a USB migration cable), the server is able to emulate the hardware component. In this manner, the server may provide data including software code to the client computing device. When the client runs the software code, the code can configure the client computing device to transfer data to the server computer device, such as by loading one or more drivers and/or software application programs provided by the server.

The circuitry that is coupled between the client computing device and server computing device may identify itself as a common hardware component such as a CD-ROM player, with an attribute that identifies it as actually being a migration cable. In this manner, a computing device aware of migration cables can emulate the other type of hardware component to another computing device that is unaware of migration cables. The circuitry may be incorporated into a cable, such as one based on a universal serial bus (USB) architecture that couples directly or indirectly to a port on the client computing device and to a port on the server computing device. The circuitry may be symmetrical such that the connection occurs independent of direction and independent of any connection order.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
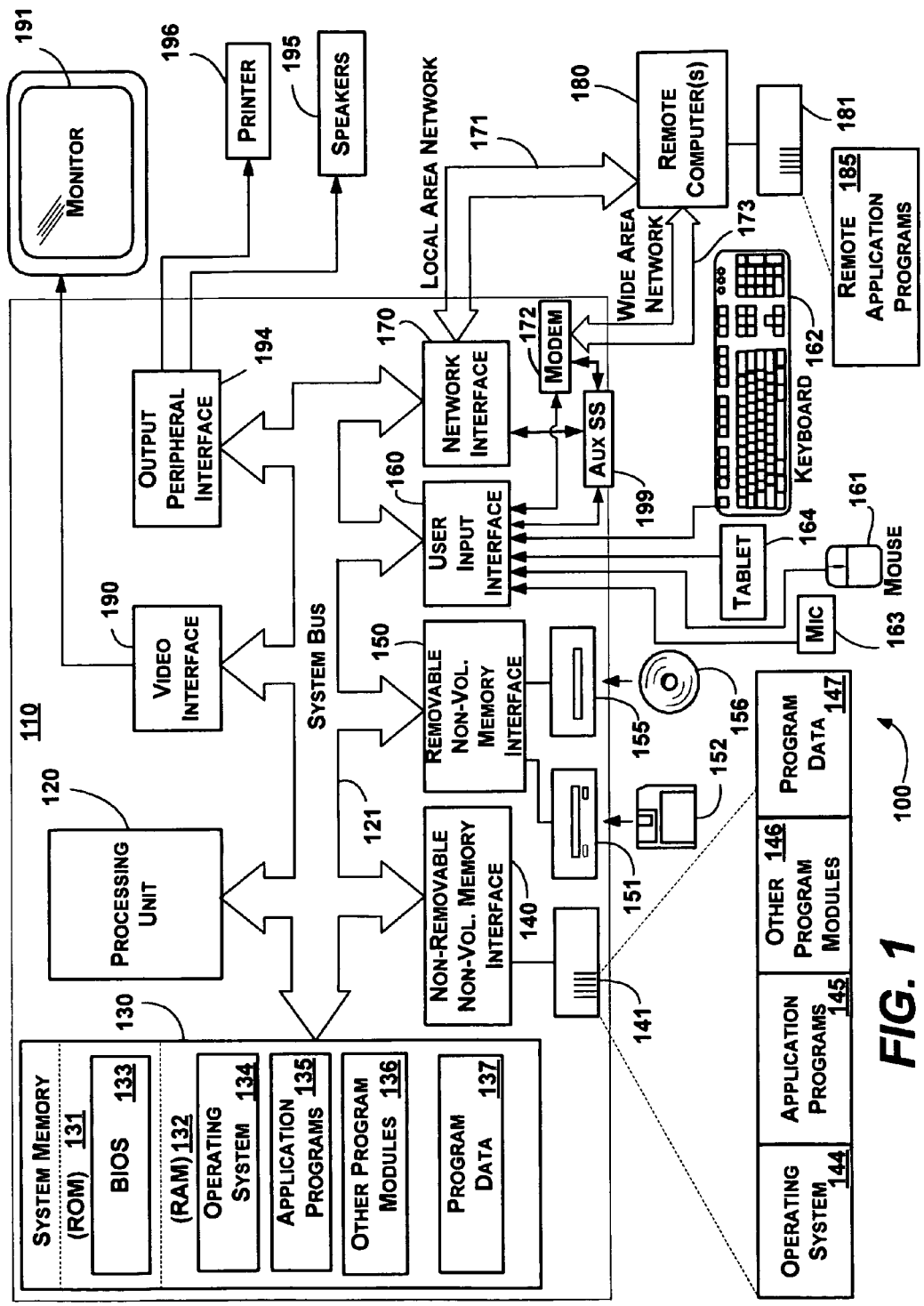
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Device Emulation to Facilitate Data Transfer

Various aspects of the technology described herein are directed towards a computing component, such as embodied in a cable that connects two computing devices together, that includes hardware, firmware and software code for migrating data from one computing device to another. In general, much of the description herein is directed towards a particular example in which the cable comprises a USB-cable or the like (e.g., a FireWire cable). To a legacy computing device, e.g., a computer system that is not aware of such cables, the cable is arranged to look like it is coupling an external CD-ROM device with inserted CD-ROM media; (a DVD-ROM player is considered equivalent, as is essentially any media player). This enables well-known "Autoplay"-type programs to automatically (or mostly automatically) operate on the legacy computer system 204, whereby the legacy computing device can be appropriately configured and controlled as a client (host) coupled to a server computing device (target), in which the server computing device is aware of and configured to work with such types of cables. Examples of a server computing device include computers running Microsoft Windows® Vista™-based operating systems, while legacy client computers may be those running earlier Windows®-based operating systems such as Windows® 98, Windows® 2000, Windows® XP, and even non-Windows®-based systems. Note that the cable and supporting software may be shipped with newer computers, or arranged as an add-on component for newer computers, however it is possible to retrofit an older computer to operate as a server.

As will be understood, however, the technology described herein is not limited to any particular type of cable, but instead may work with other types of cables, including those with a wireless link between ends, and even without a cable at all, such as via components that communicate in whole or part based on wireless USB, infrared, RF and the like. Similarly, the technology described herein is not limited to any particular type of emulated device, such as a CD-ROM device/media, but rather may emulate any device that when coupled to a computing device, causes some action on that computing device to automatically occur, and thus for example may be emulate an external hard drive, external floppy drive, and so forth. Still further, instead of a cable, a device such as a "hub"-like device may be provided to connect two or more computers together for data migration purposes. Moreover, the present invention is not limited to what is conventionally thought of as a computing device. As but one example, some phones have USB host functionality and can also leverage this technology; a service technician can also upgrade a set top box by connecting a new one to the older version. Essentially any hardware device that has storage and/or processing with some type of wired or wireless interface may benefit from the technology described herein.

As such, the present invention is not limited to the examples, structures or functionality described herein. Rather, any of the examples, structures or functionality described herein are non-limiting, and the present invention may be used various ways that provide benefits and advantages in computing and data communication in general.

Figure 2A:
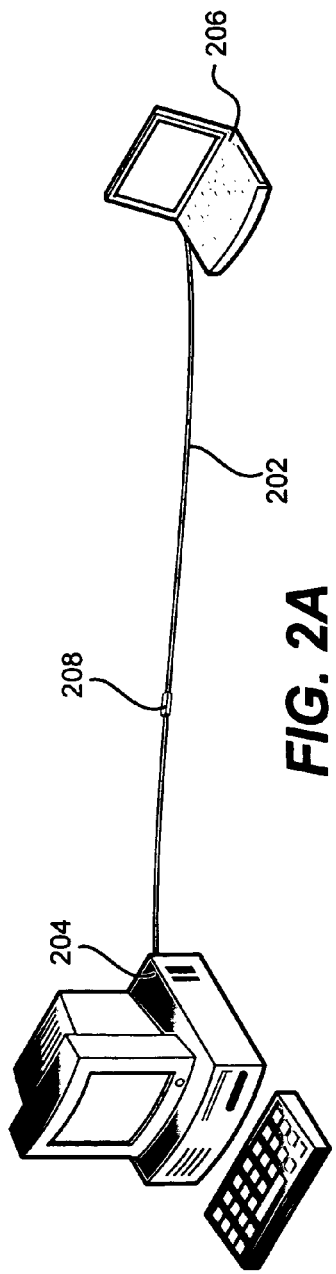
FIG. 2A is a representation of a migration cable coupling two computing devices to one another.

In one example implementation generally represented in FIG. 2A, one part of the technology described herein is incorporated into a cable 202 that plugs into ports on each of two computers 204 and 206, (where each may be based on the computing device 110 of FIG. 1). Note that while a desktop-style personal computer system is exemplified as the computing device 204, and a laptop-style computer system as the computer 206, it is understood that any device capable of communicating data may be a source device and/or a recipient device, e.g., a tablet-based personal computer, a personal digital assistant, a Smartphone, a palm/pocket-sized PC and so forth.

In one described example, the connectors are each USB type "A" connectors that physically couple to an available USB connection port, at least one of which is provided in virtually all contemporary personal computer systems. As will be understood, the cable 202 may be connected in either direction, that is, independent of which computing device is the server (primarily acting as the migrated data recipient) and which computing device is the client, providing the source of the data to be migrated. Of course, a cable of a type that needs to be connected in a certain direction may be alternatively provided.

Figure 2B:
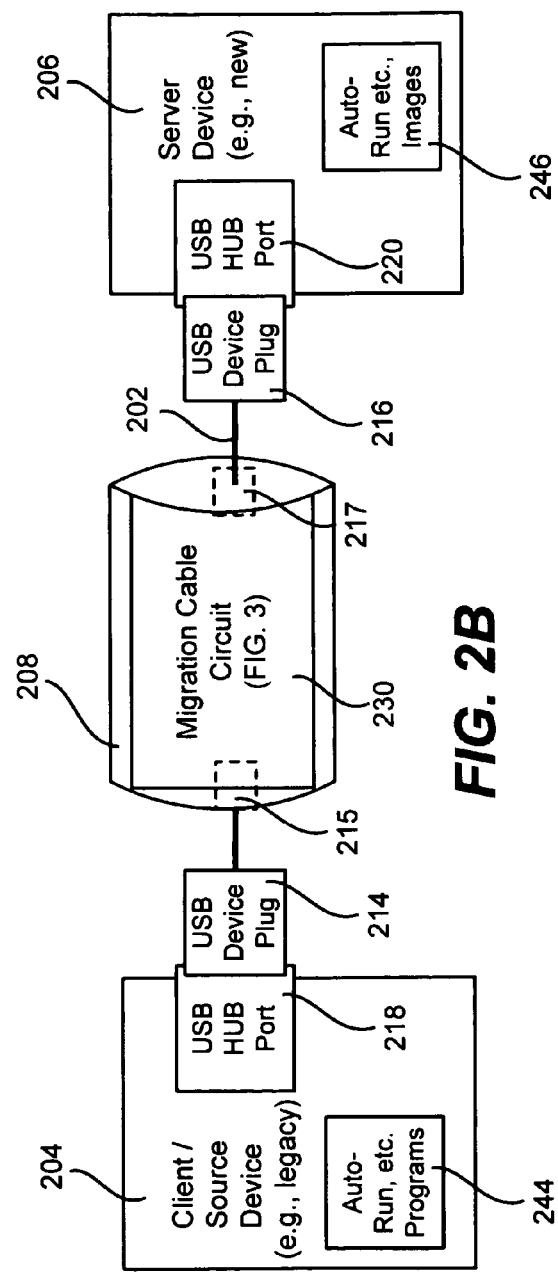
FIG. 2B is a block diagram generally representing components of attached computer systems and a migration cable including a migration cable circuit.

In general, the cable 202 described herein overcomes the shortcomings of prior migration cables by eliminating (or substantially reducing) the need for flash memory, thus greatly reducing the cost, speed and failure issues that existed with prior migration cables. To this end, the cable 202 includes built-in controller circuitry 230 (FIG. 2B and FIG. 3), e.g., contained in a protective housing 208 or the like. For example, the housing 208 may be molded and/or otherwise sealed, as is typical with the connector-to-cable wiring at either end of the cable. The housing 208 may be located at either end, or as represented in FIG. 2A, may be located somewhere on the cable 202 between the cable ends, e.g., at or near the center such that the housing 204 does not physically interfere with any other USB cables plugged into one of the computing devices 204, 206.

As can be readily appreciated, instead of having the controller circuitry 230 built into a cable, a "hub"-like device may be provided within the housing 208 to contain the circuitry. For example, conventional USB cables, each with a type "A" connector for coupling to the computing device and a type "B" connector (e.g., represented by the dashed blocks 215 and 217 in FIG. 2B) for coupling to the hub circuitry may be alternatively provided. Such a design also facilitates the connection of more than two computers for data communication (although of course a Y-cable or the like could likewise have more than two ends). Indeed, if powered from at least one end or via an alternative power source such as a battery or the like, the hub device could be wireless (e.g., infrared and/or RF capable) to at least some extent with respect to data communication. Notwithstanding these many understood variations, for simplicity hereinafter the circuitry 230 will be described as being an intermediate circuit incorporated into a single USB-type cable 202 with type "A" connections at each cable end.

Figure 3:
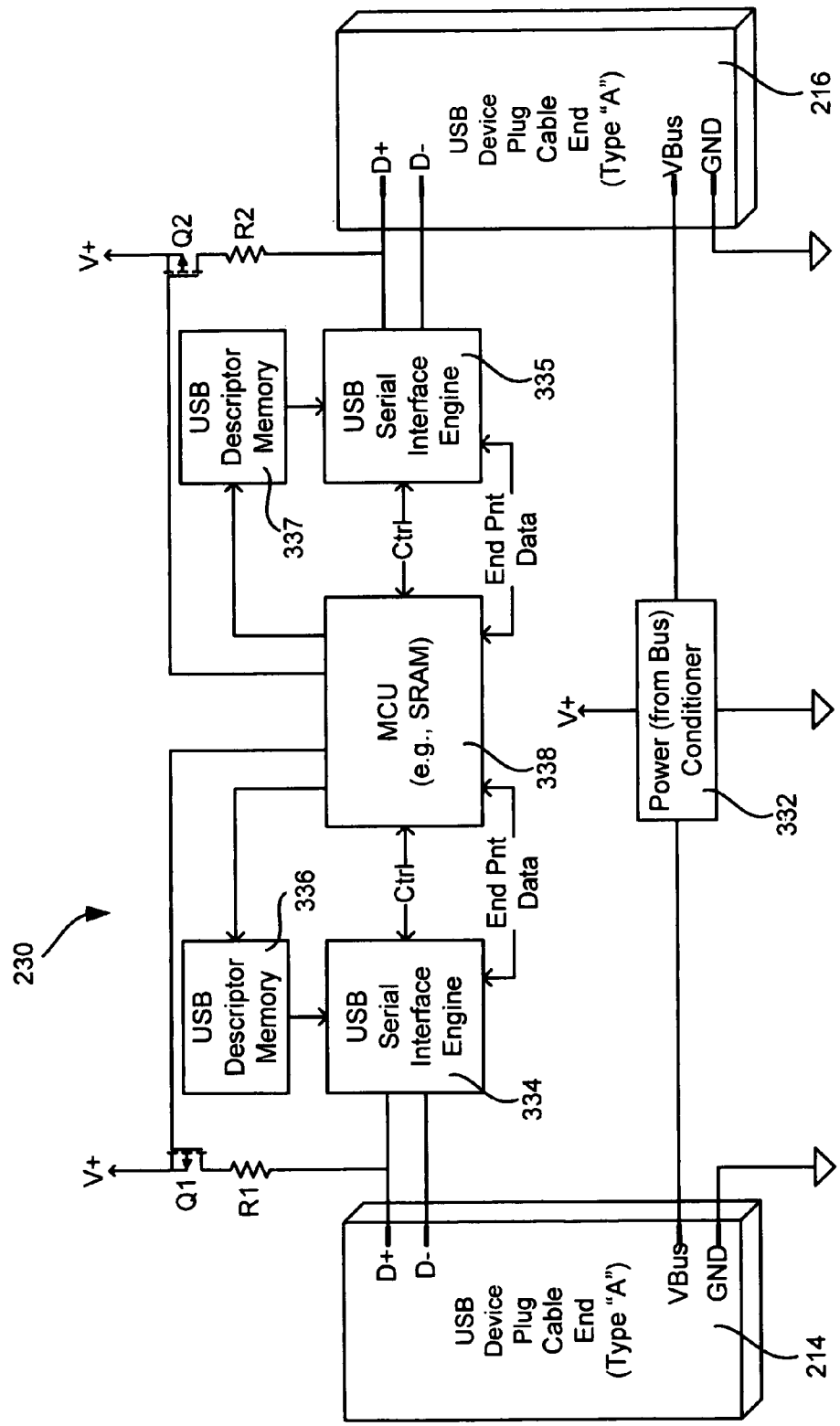
FIG. 3 is a representation of an exemplary migration cable circuit.

As generally represented in FIG. 3, in the example implementation shown, the two ends of the cable, plugs 214 and 216 are symmetrical, whereby either end may be plugged into either device 204, 206, that is, at a corresponding respective hub port 218, 220. Both ends are configured as USB devices in this example, as labeled in FIG. 2B.

FIG. 3 shows a suitable example controller circuit 230 in more detail. In this example, the circuit 230 is powered solely from the USB bus, accepting power from either or both ends of the cable when connected, and conditioning the power via a conditioner 332 to drive the cable's circuitry (V+). In alternative implementations, power from another source (e.g., a battery) may be present, although as will be understood, the circuitry described in this example needs only relatively little power. For example, the circuitry 230 represented in FIG. 3 is capable of working when both sides are attached to low-powered USB ports, (e.g., drawing a total of less than 200 milliamps).

The controller circuit 230 may include standard USB device interfaces, such as a transceiver, a USB serial interface engine 334, 335, and USB descriptor memory 336, 337 (which can be based on different sections of a single physical memory), and thus may be alternatively referred to as an interface circuit. In general, each of the serial interface engines 334 and 335 handles the basic bus serialization/deserialization, and, with the help of a microcontroller unit (MCU) 338, such as configured in static RAM (SRAM) (or possibly flash), provides suitable responses to control endpoint commands. The descriptor memory (or memories 336, 337 in this representation) is configured by the microcontroller unit 338, and determines the class and characteristics of the USB device that each end of the cable presents to the computing devices 204 and 206.

A MOSFET switch (Q1 and Q2) or the like is used by the microcontroller unit 338 to electronically connect and disconnect each cable end from the USB bus. This allows the microcontroller unit 338 to selectively disconnect, reconfigure (through the descriptor memory 336 or 337) and/or reconnect each end of the device from its associated bus server. Additionally, the microcontroller unit 338 manages device state, and is responsible for transfer of endpoint data between the two cable ends, as described below.

In this example, both ends of the cable 202 are symmetrical such that either side is capable of plugging into the server 206 or client 204, and any sequence of attaching and removing the two ends of the cable to the client and server are supported. Further, both ends of the cable 202 may work with any supported USB speeds, or any combination thereof.

One result of incorporating the circuitry of FIG. 3 into a USB-type cable with power supplied from either end of the cable (or both) is a cable 202 that is highly suitable for controlled computer-to-computer communications following enumeration. Note that in a typical migration scenario, the cable circuitry 230 is not enumerated until both ends have been plugged in, which is something the circuitry 230 is electronically capable of detecting; (an error message may be displayed in the event that the cable is plugged into the same computing device). As a result of the symmetry and the enumeration upon both ends being connected, in this example implementation, the user is not required to plug in the cable in any order or in any direction.

By use of device-based identification (e.g., Plug-and-Play technology), upon plugging the USB cable into a computing device that is aware of such types of cables, that is, the server device 206, during enumeration the cable is detected and recognized as a type of device referred to herein as a migration cable. When detected, software such as a "Migration Wizard" 662 (FIG. 6) is loaded in the server computing device 206, along with an appropriate driver. Of course, a wizard is only one type of program that may be used, and other types of interactive programs are equivalent.

With respect to the other end of the cable being plugged into any other legacy computing device, referred to as the client 204 (the migration data source) computing device, when enumeration occurs, the server device 206 enumerates itself through the cable 202 to the legacy client device 204 as being a connected device that the client device 204 recognizes. Essentially, the server device 206 performs device "spoofing" via commands passed through the cable 202.

For example, in one example implementation the server enumerates itself through the cable as being a CD-R drive (e.g., including an inserted CD-ROM media). To this end, the emulated device follows the rules of operating system power management and the rules of plug-and-play, and also meets the requirements for a generic USB CD-ROM. Alternatively, the server may enumerate itself as another type of device that implements an Autoplay scenario or the like that automatically executes software residing on the emulated device.

A CD-ROM is an effective device to emulate because legacy computers recognize CD-R drives and automatically know how to handle them. More particularly, upon recognizing a CD drive via the enumeration and the insertion of a CD (or an emulated insertion in this example), the client 204 automatically performs tasks including requesting to mount the .iso image on the CD-ROM, and when mounted, to look for, download and run an autoplay.exe application or the like 246. The server device 206 emulates the CD-ROM device with the inserted media to provide the requested image. The autoplay program, which may comprise a script that runs at least one other program, results in desired software being loaded and run on the client device 204, such as a migration driver and a client instance of the migration wizard, along with any other needed drivers.

Notwithstanding, other types of devices may be emulated. For example, a semi-automatic model may be based on one that instructs the client that the attached device is a mass storage device, with the user instructed in some way (such as by written instructions or an audio file) to open a corresponding root folder on the mass storage and run some setup (or transfer) program. The server then emulates the mass storage device as necessary. An emulated CD-RW device, with the client writing to a virtual disk to transfer files, is also a suitable alternative.

With essentially any implementation, the software programs including any needed drivers are initially provided to the client by the server 206 as part of the initial hardware component emulation. As a result, it is not necessary to burn the migration software and necessary drivers into flash (or store ROM) within the migration cable 202. This further allows the drivers and migration software used by the server and client to be easily upgradeable and maintainable. Of course, a more complex migration cable and circuitry may be built, albeit with higher associated costs. For example, a circuit including some amount of transfer buffering may be provided, as could a circuit that performed some more elaborate functionality such as encryption/decryption, decompression, error checking, and so forth.

Following this initial emulation, the CD drivers can be torn down and replaced with a suitable migration driver which can handshake with the server device to indicate that the client device is now aware that the other device is a computing device rather than a CD-ROM. Thereafter the server 206 or client 204 takes the user through the wizard 662 (FIG. 6) to guide the user and allow the user to choose what data to transfer from the client source 204, and thus perform a suitable data migration. Virtually any protocol may be used for the data transfer, e.g., raw USB for high speed, Ethernet over USB, some existing file transfer protocol, and so forth.

It should also be noted that upon subsequent couplings via the cable 202, the client and server can handshake with one another to indicate they can communicate, e.g., without device emulation, whereby a network, cluster, or the like may be formed. For example, when the device-type ID and attribute ID (e.g., a USB descriptor of device type CD-ROM plus a special sub-descriptor that identifies the cable as a migration cable to machines aware of such a component) is received upon connection, a former client that is now aware of such a transfer mechanism can return handshake-related communications instead of CD-ROM-related requests, whereby the devices can communicate without initial emulation. Note that a client-server relationship may remain, or the devices may negotiate to become peers. As part of any subsequent connection, upgrades to drivers and/or other code may be made from either device to the other through the cable 202.

As can be seen, the example implementation provides the interface circuit 230 as part of the cable 202 that connects two machines through their USB ports 218 and 220. In one implementation, both ends of the cable 202 have standard "A"-type plugs/connections 214 and 216 for corresponding ports 218 and 220, respectively. Alternatively, the ends may connect to other standard port(s) specified for that industry specification, e.g., a USB mini-AB port. Although not explicitly shown in the drawings, these plugs 214, 216 and the circuitry 230 between them support one or more additional USB hubs that may exist between one or both ends and their respective ports on the computing device.

Thus, the cable 202 is not only suitable for initial data migration, but rather may alternatively be used to connect two (or more) computers for whatever communication purposes are desired, e.g., as a network, as a clustered computer, and so forth. For example, instead of requiring a crossover Ethernet cable to directly connect two personal computers, the migration cable may be used for networking, synchronizing and the like. Note that the wizard 662 or similar program can be used to offer this option, and may configure the computing devices as necessary upon reconnection, e.g., transfer drivers and software only if not already present on the client. Note that updated drivers and other software may be transferred, and the client can become a device aware of such cables, in which event enumeration can result in a handshake between connected devices rather than emulation of a CD-ROM to a legacy client.

As can be readily appreciated, the emulation of a USB device or the like bootstraps the initial communication between the server device and the client legacy device using a simple cable connection. Thereafter, the client device may be controlled to accomplish the needed file transfer.

In the above example, because the emulated device provides the software, no software/driver installation via external CD or other media is required by the end user. Moreover, by emulating a CD player with inserted media, no reboots are required of either system in order to function. Instead, the drivers are installed and any required software (e.g., a client instance of the migration wizard) is automatically installed on the client after the connection has been made on both ends. To facilitate ease-of-use, the needed software is auto-run on both systems, and existing class drivers for USB are reused to the extent possible. The language of the migration wizard software 662 may be based on the language as the locale of the client device's operating system.

Other possible requirements for successful migration include that the connected device or devices may need to pass hardware compatibility tests, that the server operating system may need to store software to run on different (but supported) operating systems, with some user interface output generated on the server if the server-side machine is attached to unsupported operating systems. Users may need to be logged on to the client device as an administrator, although this not necessarily for the server device.

Turning to a consideration of software operation, as generally indicated above, the software installation that supports such a data migration scenario may be divided into distinct phases, including a first phase directed towards initial discovery and autoplay/software installation, and a second phase directed towards launching of the migration wizard 662 for data transfer.

As described above, the first phase begins when both ends of the USB cable are attached to the devices and the devices are otherwise operational. Once both ends are attached, each device is notified of a USB device attach. As is known, this causes the USB core stack to create a devnode for its corresponding device, and causes Plug-and-Play technology to load the necessary driver stack for its respective device.

On the client device, the operating system is not aware of such types of cables, and thus recognizes the cable as a standard CD-ROM device with no media inserted initially. On the server side, the system is pre-configured to recognize the migration cable as a special device, and loads a custom migration cable.

Once the server side has its driver stack loaded along with the application program that controls the client side installation, the cable sends a particular (e.g., vendor-specific) command to the device. The purpose of this command is to inform the device that it is attached to the cable and that the device must operate according to the cable's rules for the first phase. The command essentially instructs the device to report a CD-ROM insertion, whereby the device indicates its CD-ROM presence to the client device which in turn launches Autoplay.

To emulate a CD-ROM, any requests made by the client device 204 to the cable circuitry 230 are channeled to the server device 206. The server-side software simulates the presence of an ISO image CD, containing the automatically run file 246 and related content. The client-side device 204 processes the auto-run file(s), with no knowledge of the fact that the files are actually being fed from the server machine 206 rather from CD-ROM media.

Figure 4:
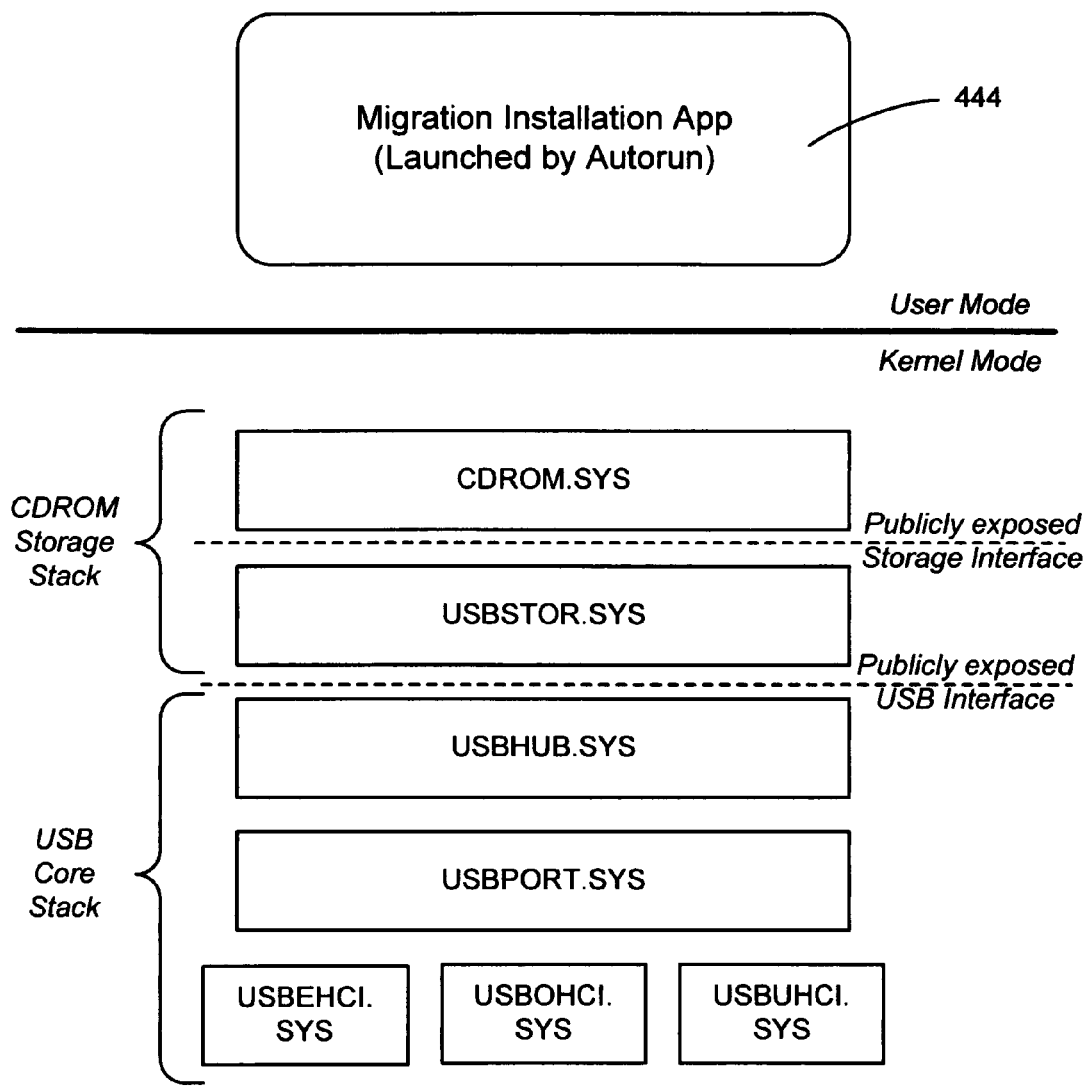
FIG. 4 is a representation of a migration program installed on a client-side computing device having a driver stack loaded thereon.
Figure 5:
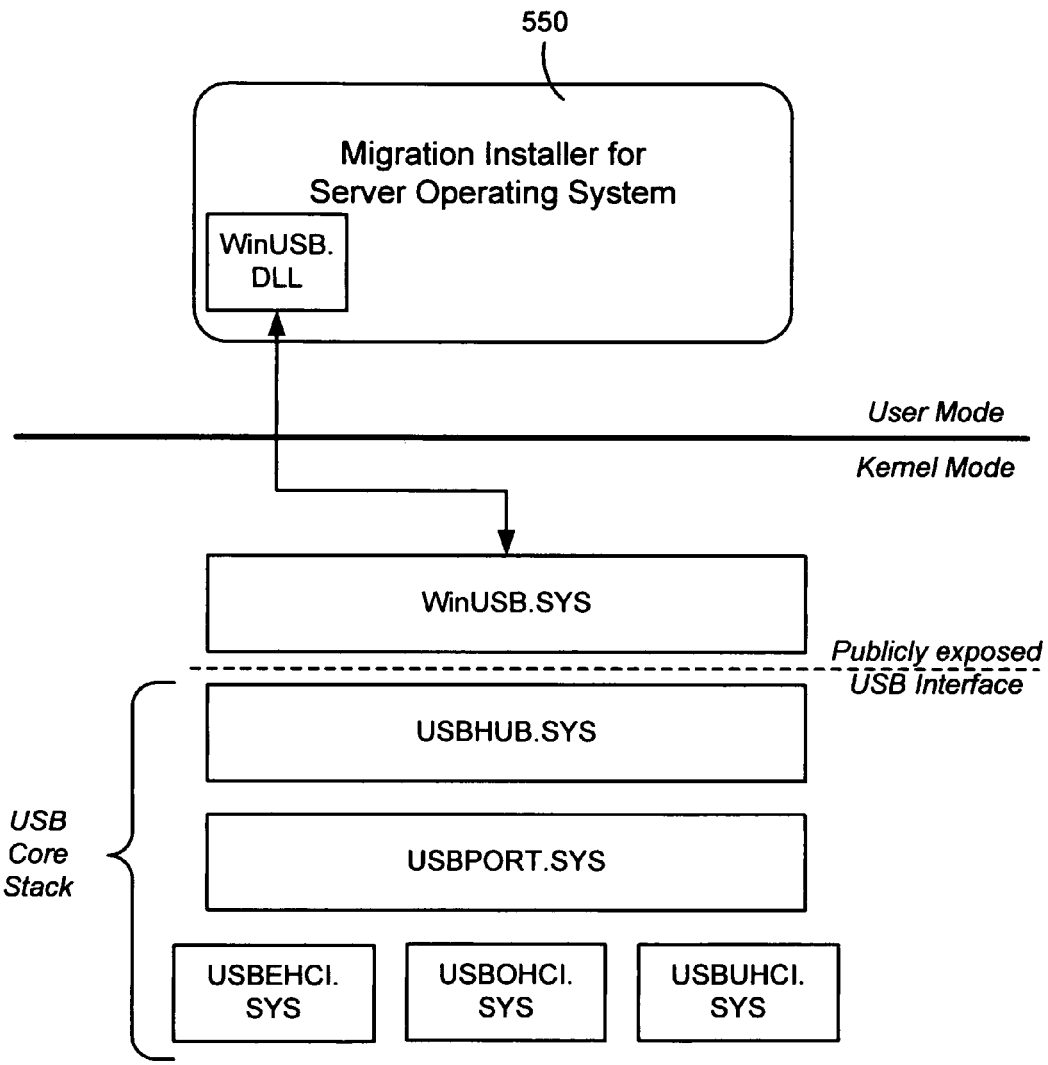
FIG. 5 is a representation of a migration installer program running on a server-side computing device having a driver stack loaded thereon.

The autorun program 244 (FIG. 2) is configured to launch an application to install the necessary migration software 444 on the client machine 204, as generally represented in FIG. 4, which also shows a representation of the driver stack on the client operating system. FIG. 5 shows the migration installer 550 and the driver stack on the server operating system.

The application program launched on the client device may first check to see if the same version of the software has already been installed and if reinstallation/repair are necessary. If software installation is necessary, the launched application takes care of this (it may be necessary for the client 204 to report its operating system and/or platform to the server 206). If reinstallation is not necessary, or after the software is installed, the autorun application proceeds to the final step in this first phase, whereby it indicates to the circuitry 230 (and hence to the server device 206) whether installation succeeded, or returns an error value if it failed. This may be done through a SCSI pass-through command; note that SCSI pass-through commands on may require Administrator rights, whereby this process will not work for non-Administrator users or any user account without privileges to use SCSI pass-through. A command provided by the circuitry 230 marks the end of the first phase and informs both the server and client to enter the second phase. Note that an alternative implementation may instruct the customer to physically "plug-and-play" the device.

The following table identifies the Hardware IDs (HWIDs) and the Compatible IDs (CIDs) reported by the device in the first phase in one example implementation. As both ends of the cable are symmetrical (from a hardware perspective), they will report the same HWIDs and CIDs. In this example, the format of the hardware IDs is as follows, where xxxx represents the Vendor ID of the manufacturer (allocated by the USB-IF), yyyy represents the product ID for this device and is unique for different device types, and zzzz represents a version number of the product (many vendors use 0x0100 for the RTM release of the device, as it represents 1.00 via BCD representation):

USB\VID_xxxx&PID_yyyy&REV_zzzz
USB\VID_xxxx&PID_yyyy

Compatible IDs exposed by the device in the first phase include USB\MS_COMP_UMC10P1, USB\Class_aa&SubClass_bb&Prot_cc, USB\Class_aa&SubClass_bb and USB\Class_aa, where aa represents the class code for this device (it should be set to "0x08"), bb represents the subclass code for this device (it should be set to "0x06") and cc represents the protocol code for this device (should be set to "0x50"). A first Compatible ID may be generated using the Extended CompatID Descriptor (part of the Microsoft operating system descriptor set for USB). One recommended MSComp_ID is "UMC10P1" representing USB Migration Cable Version 1.0 in the first phase.

The following table sets forth one example of suitable content for an Extended Compat ID Descriptor) for the first phase):

the same, with the applications launched on the second phase device enumeration to perform data transfer.

If a device stalls during data transfer, either the client or server may choose to do an endpoint reset, e.g., by issuing a clear-stall (a USB control command) to the specific endpoint. This often will allow the USB transfer to continue. If the clear-stall command does not rescue the transfer, then the client or the server may execute a soft-reset on the device. Should the user manually (or electronically) emulate a PnP of the cable, both ends of the cable should return to the beginning of the first phase. If second phase software is already running, it does not re-launch (or launch a new instance) of the second phase migration wizard 662.

The following table identifies the Hardware IDs (HWIDs) and the Compatible IDs (CIDs) reported by the device in the second phase in one example implementation. As both ends of the cable are symmetrical (from a hardware perspective), they will report the same HWIDs and CIDs. In this example, the format of the hardware IDs is as follows, where xxxx represents the Vendor ID of the manufacturer (allocated by the USB-IF), which can be the same Vendor ID as used in phase, yyyy represents the product ID for this device and is unique for different device types, and is also different from the product ID used in the first phase, and zzzz represents a version number of the product, (many vendors use 0x0100 for the RTM release of the device, as it represents 1.00 via BCD representation), which be the same revision ID as used in the first hase:

USB\VID_xxxx&PID_yyyy&REV_zzzz
USB\VID_xxxx&PID_yyyy

Compatible IDs exposed by the device in the second phase include USB\MS_COMP_UMC10P1, USB\Class_aa&SubClass_bb&Prot_cc, USB\Class_aa&SubClass_bb and USB\Class_aa, where aa represents the class code for this device (it should be set to "0x08"), bb represents the subclass code for this device (it should be set to "0x06") and cc represents the protocol code for this device (should be set to "0x50"). A first Compatible

| Offset | Field | Size | Value | Remarks |
|---|---|---|---|---|
| 0 | dwLength | 4 | 0x00000028 | 40 Bytes |
| 4 | bcdVersion | 2 | 0x0100 | Version 1.00 |
| 6 | wIndex | 2 | 0x04 | Fixed |
| 8 | bCount | 1 | 0x01 | One (1) Function in this device |
| 9 | RESERVED | 7 | 0x00000000000000 | RESERVED |
| 16 | bFirstInterfaceNumber | 1 | 0x00 | Start at Interface 0 |
| 17 | RESERVED | 1 | 0x01 | RESERVED |
| 18 | compatibleID | 8 | 0x554D433130503100 | "UMC10P1" |
| 26 | subCompatibleID | 8 | 0x0000000000000000 | Null filled |
| 34 | RESERVED | 6 | 0x000000000000 | RESERVED |

Figure 6:
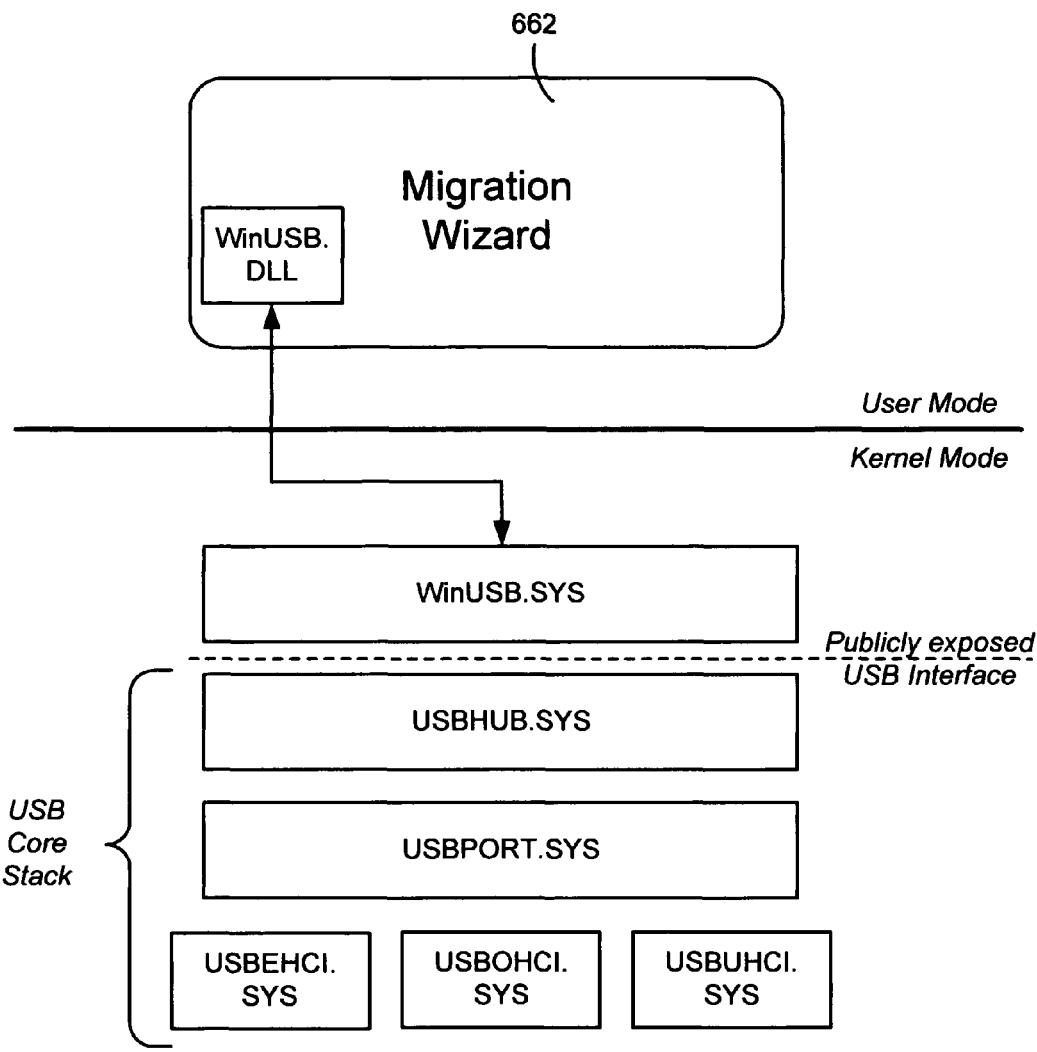
FIG. 6 is a representation of a migration program and driver stack running on a client-side computing device, a server-side computing device, or both to accomplish data migration.

A second phase, directed towards migration wizard 662 launch and data transfer, begins when both the client side and the server side of the devices re-enumerate (e.g., simultaneously) and appear with a new set of descriptors. In the second phase, the cable 202 and its circuitry 230 may appear symmetric to both the client and server devices, e.g., in one implementation, the same drivers and applications are loaded on both sides of the stack, as represented in FIG. 6. In alternative implementations, the client 204 may have a different set of drivers (e.g., compatible with its particular operating system) and/or may run one or more applications that are different from those of the server device 206. For purposes of simplicity, as described herein, the drivers and programs are ID may be generated using the Extended CompatID Descriptor (part of the Microsoft operating system descriptor set for USB). One recommended MSComp_ID is "UMC10P1" representing USB Migration Cable Version 1.0 in the second phase.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   detecting, via a migration cable, a coupling of a server computing device and a client computing device;
   outputting first identification data from the migration cable to the server computing device the first identification data corresponding to a hardware component that the server computer recognizes as a data transfer device;
   outputting second identification data from the migration cable to the client computing device, the second identification data corresponding to a hardware component that the client computing device recognizes as a data source;
   emulating the data source at the server computing device by providing data comprising software code to the client computing device;
   the migration cable providing a command that marks the end of a first phase and informs the server and client computing devices to enter a second phase;
   beginning the second phase wherein both the client and server computing devices re-enumerate and appear with a new set of descriptors; and
   running the software code on the client computing device to configure the client computing device to transfer data to the server computer device.

2. The method of claim 1 wherein outputting the second identification data comprises enumerating the migration cable as an attached device upon detecting the coupling of both the client computing device and the server computing device to the migration cable.

3. The method of claim 2 wherein enumerating the migration cable comprises providing data from the migration cable that indicates to the client computing device that the client computing device is coupled to a type of media player device.

4. The method of claim 3 wherein emulating the data source at the server comprises communicating information to the client computing device that corresponds to media being inserted into the media player.

5. The method of claim 3 wherein emulating the data source at the server comprises responding to media player requests from the client computing device as if the server was a media player.

6. The method of claim 3 wherein emulating the data source at the server comprises allowing the client to mount a virtual image of inserted media maintained at the server, and to load and run an executable application program that is part of the image.

7. The method of claim 1 further comprising, incorporating the migration cable into a USB cable with USB type A connectors at each of two ends.

8. In a computing environment having a client computing device and a server computing device, a system comprising:
   a migration cable that is coupled between the client computing device and server computing device, the migration cable configured to identify itself to the client computing device as a data source device;
   the migration cable configured to identify itself to the server computing device as a data transfer device;
   the server computing device configured to emulate the data source device to provide the client computing device with at least one software program that when executed, configures the client computing device for communication with the server device;
   the migration cable providing a command that marks the end of a first phase and informs the server and client computing devices to enter a second phase; and
   the client and server computing devices entering a second phase by re-enumerating and appearing with a new set of descriptors such that one or more applications are launched in the second phase re-enumeration to perform data transfer.

9. The system of claim 8 wherein the migration cable is incorporated into a cable.

10. The system of claim 9 wherein the cable is based on a universal serial bus (USB) architecture.

11. The system of claim 8 wherein the cable couples directly or indirectly to a port on the client computing device and to a port on the server computing device, with the migration cable being symmetrical such that the connection occurs independent of direction and independent of any connection order.

12. The system of claim 8 wherein the data source device that the migration cable identifies itself as to the client comprises a media player, and the server computing device emulates the media player, including providing data indicative of inserted media and responding to media player commands to allow the client computing device access to a virtual image corresponding to the media.

13. The system of claim 8 wherein the migration cable includes memory, an interface engine, a controller, and means for selectively electronically connecting and disconnecting to the client computing device and the server computing device.

* * * * *